(12) United States Patent
Reuter et al.

(10) Patent No.: US 7,269,631 B2
(45) Date of Patent: *Sep. 11, 2007

(54) ARCHITECTURE FOR PARALLEL DISTRIBUTED TABLE DRIVEN I/O MAPPING

(75) Inventors: James M. Reuter, Colorado Springs, CO (US); David W. Thiel, Colorado Springs, CO (US); Robert G. Bean, Monument, CO (US); Richard F. Wrenn, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1353 days.

This patent is subject to a terminal disclaimer.

(21) Appl. No.: 09/872,970

(22) Filed: Jun. 1, 2001

(65) Prior Publication Data

US 2002/0026558 A1 Feb. 28, 2002

Related U.S. Application Data

(60) Provisional application No. 60/209,109, filed on Jun. 2, 2000, provisional application No. 60/209,326, filed on Jun. 2, 2000.

(51) Int. Cl.
*G06F 15/167* (2006.01)
*G06F 12/16* (2006.01)

(52) U.S. Cl. ............. 709/216; 711/100; 711/162; 709/229; 709/230

(58) Field of Classification Search ................ 709/200, 709/229, 211, 228; 711/152, 112, 103, 5; 707/200, 9; 710/20
See application file for complete search history.

(56) References Cited

U.S. PATENT DOCUMENTS 5,124,987 A * 6/1992 Milligan et al. ............... 714/7

(Continued)

*Primary Examiner*—Bunjob Jaroenchonwanit
*Assistant Examiner*—Dohm Chankong (57) ABSTRACT

The present invention provides a system and method for creating virtualized storage in a storage area network using distributed table-driven input/output mapping. The present invention distributes the virtualization mapping in multiple parallel, mapping agents that are separate from a controller. This allows the performance-sensitive mapping process to be parallelized and distributed optimally for performance, while the control of the mapping may be located in a controller chosen for optimal cost, management, and other implementation practicalities. The mapping agents store the virtual mapping tables in volatile memory, substantially reducing the cost and complexity of implementing the mapping agents. The controller is responsible for persistent storage of mapping tables, thereby consolidating the costs and management for persistent mapping table storage in a single component. Distributed virtualization also allows the controller to manage multiple virtual disks used by multiple host systems, and allows a single virtual disk to be shared by multiple host systems. The mapping agents preferably do not interact only with other mapping agents, thereby improving the scalability of the virtual storage system and the virtual storage system's tolerance of component failures.

28 Claims, 7 Drawing Sheets

U.S. PATENT DOCUMENTS

| | | | |
|---|---|---|---|
| 5,210,866 A * | 5/1993 | Milligan et al. | 714/6 |
| 5,390,186 A * | 2/1995 | Murata et al. | 711/113 |
| 5,404,361 A * | 4/1995 | Casorso et al. | 714/767 |
| 5,404,478 A * | 4/1995 | Arai et al. | 711/206 |
| 5,410,667 A * | 4/1995 | Belsan et al. | 711/114 |
| 5,459,857 A * | 10/1995 | Ludlam et al. | 714/6 |
| 5,579,499 A * | 11/1996 | Fecteau et al. | 711/209 |
| 5,745,789 A * | 4/1998 | Kakuta | 710/21 |
| 5,941,972 A * | 8/1999 | Hoese et al. | 710/315 |
| 6,212,531 B1 * | 4/2001 | Blea et al. | 707/204 |
| 6,260,120 B1 * | 7/2001 | Blumenau et al. | 711/152 |
| 6,269,431 B1 * | 7/2001 | Dunham | 711/162 |
| 6,324,627 B1 * | 11/2001 | Kricheff et al. | 711/163 |
| 6,343,324 B1 * | 1/2002 | Hubis et al. | 709/229 |
| 6,353,878 B1 * | 3/2002 | Dunham | 711/162 |
| 6,385,706 B1 * | 5/2002 | Ofek et al. | 711/162 |
| 6,421,767 B1 * | 7/2002 | Milillo et al. | 711/162 |
| 6,493,811 B1 * | 12/2002 | Blades et al. | 711/203 |
| 6,529,995 B1 * | 3/2003 | Shepherd | 711/114 |
| 6,643,748 B1 * | 11/2003 | Wieland | 711/152 |
| 6,647,387 B1 * | 11/2003 | McKean et al. | 707/9 |
| 6,671,776 B1 * | 12/2003 | DeKoning | 711/114 |
| 6,718,404 B2 * | 4/2004 | Reuter et al. | 710/20 |
| 6,742,090 B2 * | 5/2004 | Sanada et al. | 711/152 |
| 6,745,207 B2 * | 6/2004 | Reuter et al. | 707/200 |
| 6,772,231 B2 * | 8/2004 | Reuter et al. | 710/8 |
| 6,775,790 B2 * | 8/2004 | Reuter et al. | 714/5 |
| 6,865,617 B2 * | 3/2005 | Zeidner et al. | 710/3 |

* cited by examiner

ARCHITECTURE FOR PARALLEL DISTRIBUTED TABLE DRIVEN I/O MAPPING

RELATED APPLICATIONS

This application claims priority from U.S. Provisional Application Nos. 60/209,109 and 60/209,326, filed on Jun. 2, 2000, the disclosures of which are hereby incorporated by reference in full.

FIELD OF THE INVENTION

The present invention is a virtualized data storage system using distributed tables with input/output mappings.

BACKGROUND OF THE INVENTION

Figure 1A:
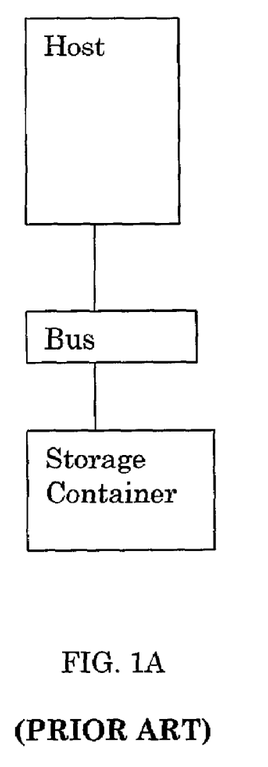
FIGS. 1A-1B [PRIOR ART] are known systems for connecting a host to a storage device.

A stand alone computer generally connects to data storage devices, such as hard disk, floppy disk, tape, and optical drives, via a fixed communication channel or bus, as schematically illustrated in FIG. 1A. While the communication channel allows high-speed data transfers, access to the storage device is limited to the stand-alone computer.

Figure 1B:
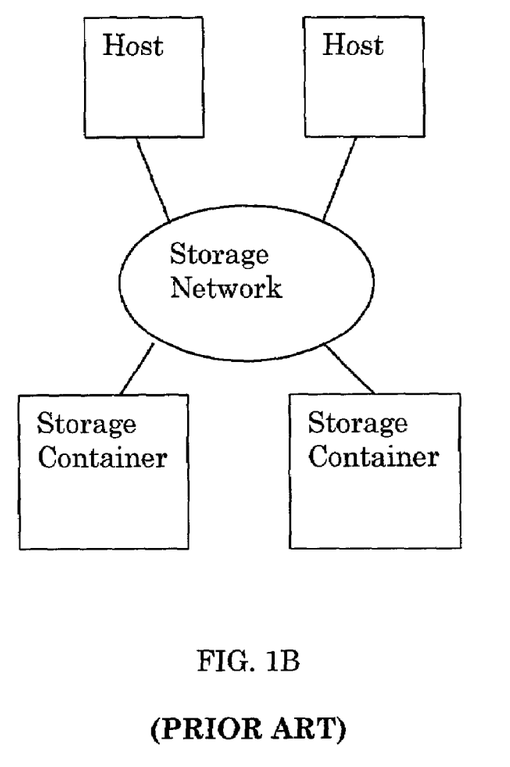

Over time, it has become necessary for multiple devices to connect to a storage device so that multiple users may share data. As a result, developers created a storage area network (SAN) consisting of multiple, interconnected, proximately located devices, as schematically illustrated in FIG. 1B. The SAN typically includes one or more network access servers that administer the interaction of the devices and the operation of the network, including data storage devices that are accessible by the other devices in the SAN. The devices may be connected through Small Computer Systems Interface (SCSI) buses to establish parallel communication channels between the devices. In SCSI systems, a unique Logical Unit Number (LUN) is used to designate data storage locations, where each location is a separate storage device or partition of a storage device. Each LUN is further divided into blocks of small, easily manageable data sizes. By combining LUN zoning with port zoning to implement storage sharing, the SAN can have centralized, distributed data storage resources. This sharing of data storage resources across the SAN substantially reduces overall data and storage management expenses, because the cost of the storage devices may be amortized across multiple devices. The use of centralized, distributed data storage also provides valuable security features because the SAN may limit the ability of a device to access data in a particular zone. The performance costs of using consolidated data storage configurations within the SAN are substantially reduced through the use of Fibre Channel connections between the LUNs and the other network devices to achieve high-speed data input and output (I/O) operations. The SAN operates, in effect, as an extended and shared storage bus between the host and the storage containers to offer, among other things, improved storage management, scalability, flexibility, availability, access, movement, and backup. The centralization of data storage, however, presents new problems, including issues of data sharing, storage sharing, performance optimization, storage on demand, and data protection.

Because of these issues, developers have recently added a virtualization layer to the SAN hierarchy. The virtualization layer refers to software and hardware components that divide the available storage spaces into virtual disks or volumes without regard to the physical layer or topology of the actual storage devices. Typically, virtual volumes are presented to the server operating system as an abstraction of the physical disk and are used by the server as if virtual volumes were physical disks. The virtual volumes are not LUNs on a storage array. Instead, the virtual volumes may be created, expanded, deleted, moved, and selectively presented, independent of the storage subsystem. Each has different characteristics, and therefore expanded as the available storage expands. The SAN virtualization presents a single pool of SAN resources and a standard set of SAN services to applications residing on a broad range of operating platforms.

However, SANs using conventional disks and storage subsystems incur substantial system and storage management expenses due to the tight coupling between the computer system and the storage. Because of these and other reasons, the existing SAN technologies also have limited scalability. Furthermore, a key remaining issue for SAN virtualization is the distribution of storage resources among the various devices of the SAN.

Accordingly, there exists a need for an improved data storage system that addresses these and other needs in the SAN. One proposed class of storage system uses a subsystem to further improve the performance of the SAN by separating control and access functions from other storage functions. In such a class, access functions govern the ability to use and manipulate the data on the SAN, and control functions relate to the administration of the SAN such as device monitoring, data protection, and storage capacity utilization. Separating control and access functions from other storage functions pulls the virtualization function out of the server and onto the SAN. In addition to the virtualization of the storage provided by traditional, server bound implementations, the virtualization layer on the SAN enables the automation of important data movement functions, including the copying, movement, and storage of data through the creation and expansion of virtual volumes.

Figure 2A:
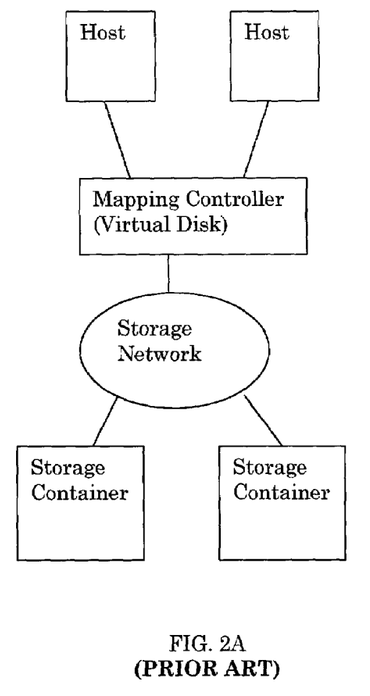
FIGS. 2A-2C [PRIOR ART] are known virtualized storage area networks.
Figure 2B:
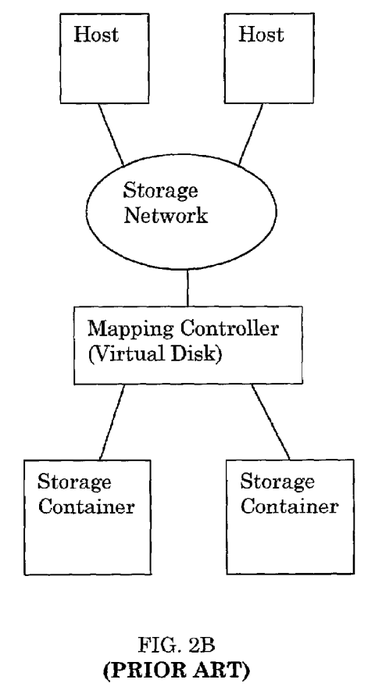
Figure 2C:
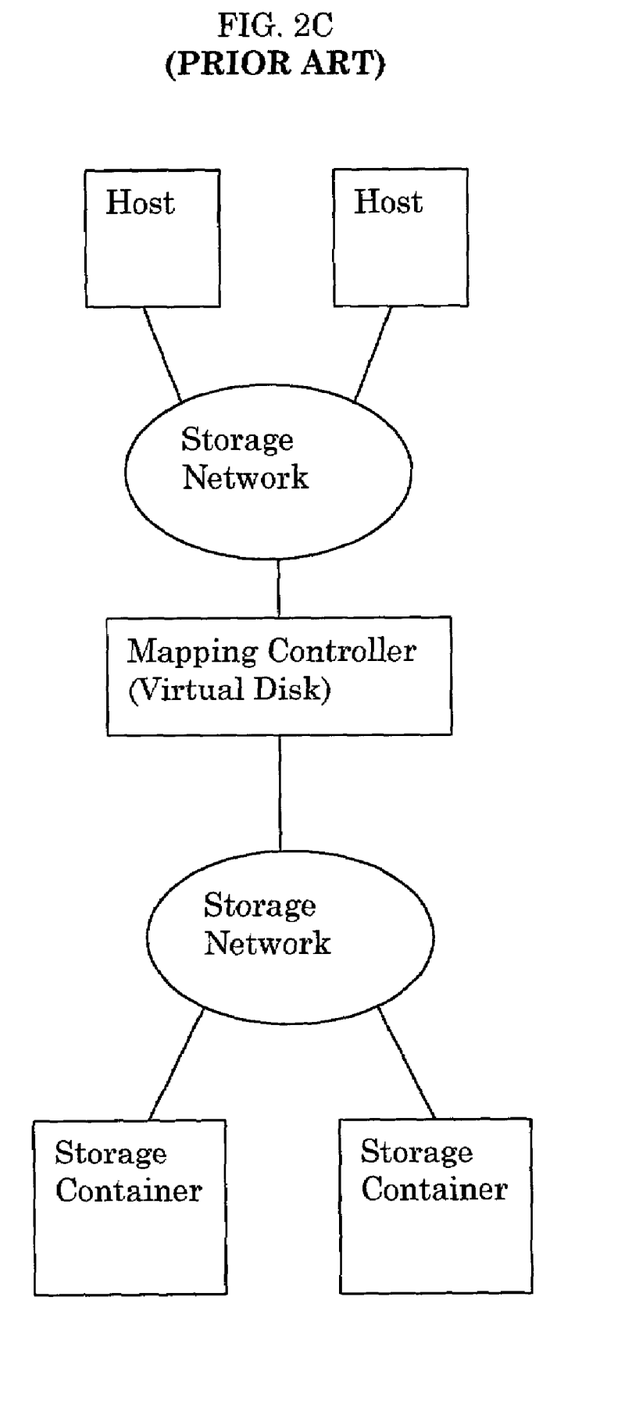
Figure 3A:
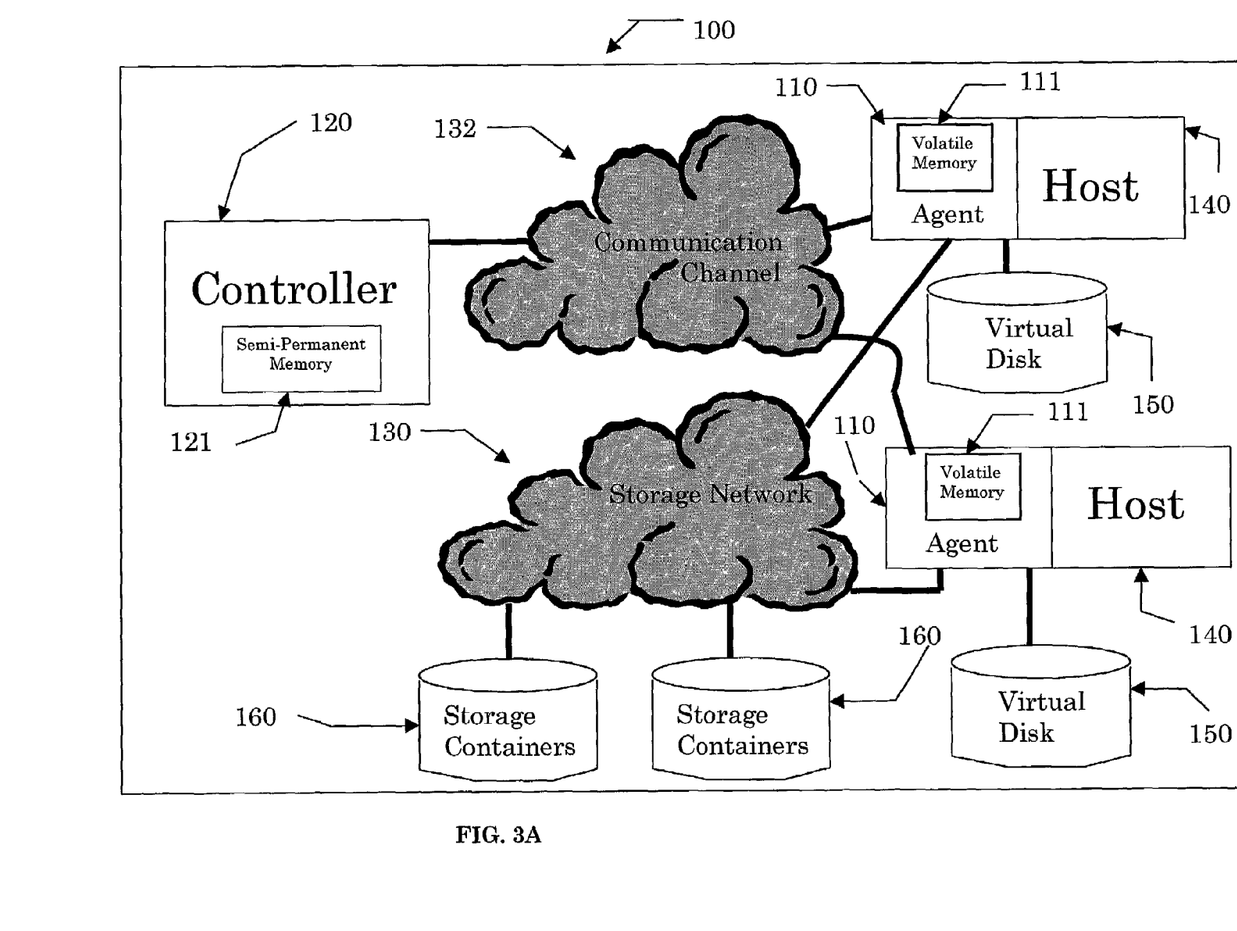
FIGS. 3A-3B are schematic illustrations of a distributed virtual storage area network in accordance with embodiments of the present invention.
Figure 3B:
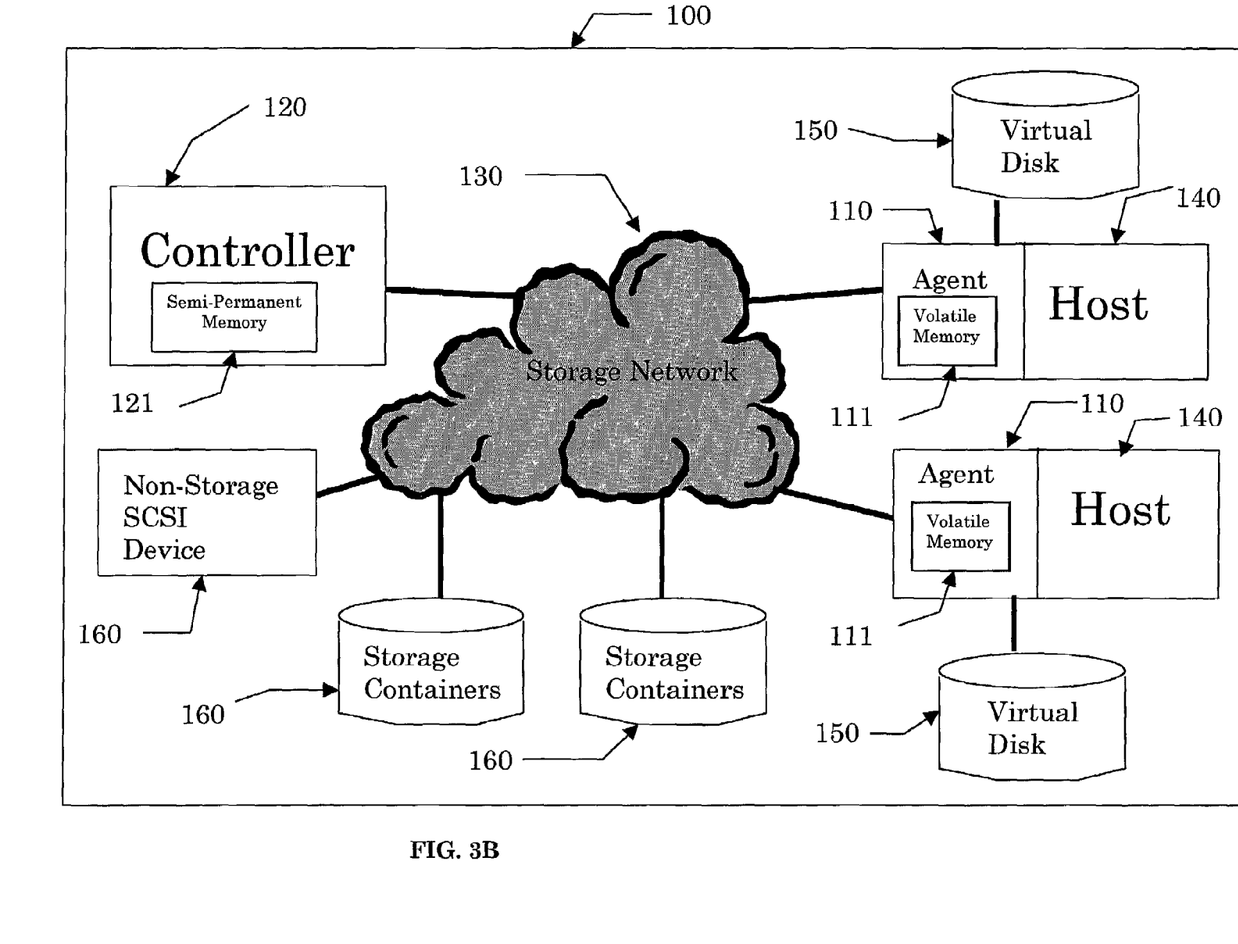

Toward this purpose of separating control and access functions from other storage functions, currently proposed virtualized storage systems consolidate control and mapping functions in a centralized location such as in the host, in a storage controller, or in a special virtualization component in the SAN, as illustrated in FIGS. 2A-2C respectively. Centralizing the control and mapping functions avoids problems associated with distributed mapping. However, storage virtualization schemes that are centralized in one component suffer from various scaling limitations, including the inabilities of scaling to multiple computer systems, multiple storage systems, and large storage networks with adequate performance.

Improved scalability may be achieved through a distributed virtualized storage system. However, attempts to form distributed virtualized storage systems through the use of known technologies, such as array controllers, for distributing the mapping used in the virtual storage use simple algorithmic distribution mechanisms that limit data management flexibility, e.g. Redundant Array of Independent Disk (RAID). Furthermore, the known technologies do not address the needs of a scaleable virtual storage system, including issues of storage sharing, data sharing, performance optimization, storage system delays, and data loss risks.

SUMMARY OF THE INVENTION

In response to these needs, the present invention provides a system and method for creating virtualized storage in a storage area network using distributed table-driven input/output mapping. The present invention distributes the virtualization mapping in multiple parallel mapping agents that are separate from a controller. This configuration allows the performance-sensitive mapping process to be parallelized and distributed optimally for performance, while the control of the mapping can be located in the controller chosen for optimal cost, management, and other implementation practicalities. The mapping agents store the virtual mapping tables in volatile memory, substantially reducing the cost and complexity of implementing the mapping agents. The controller is responsible for persistent storage of mapping tables, thereby consolidating the costs and management for persistent mapping table storage in a single component. Distributed virtualization also allows the controller to manage multiple virtual disks used by multiple host systems, and even allows a single virtual disk to be shared by multiple host systems. The mapping agents preferably do not interact with other mapping agents, thereby improving the scalability of the virtual storage system and the virtual storage system's tolerance of component failures.

BRIEF DESCRIPTION OF THE DRAWINGS

These and other advantages of the present invention are more fully described in the following drawings and accompanying text in which like reference numbers represent corresponding parts throughout.

DETAILED DESCRIPTION OF A PREFERRED EMBODIMENT OF THE INVENTION

As illustrated in FIGS. 3A-3B and 4A-4B, the present invention provides a virtualized storage area network (SAN) system 100 using one or more distributed mapping tables 200, as needed to form one or more virtual disks 150 for input/output (I/O) operations between the hosts 140 and storage containers 160. In particular, the table 200 contains a mapping that relates a position in the virtual disk 150 with the actual location on the storage containers 160. The specific contents of the table 200 are described in greater detail below.

The present invention covers an improved storage area network (SAN). The invention can therefore be applied to any known storage network 130. Within the SAN, it should be appreciated that the storage containers 160 are known and may refer to any type of present or future known programmable digital storage medium, including but not limited to disk and tape drives, writeable optical drives, etc. Similarly, the hosts 140 may be any devices, such as a computer, printer, etc. that connect to a network to access data from a storage container 160.

Likewise, the storage network 130 is also intended to include any communication technology, either currently known or to be developed in the future, such as the various implementations of Small Computer Systems Interface (SCSI) or Fibre Channel. This distributed virtualization is most useful in environments where a large amount of storage is available and connected using some sort of "storage network" infrastructure. In one preferred implementation, the storage network 130 is based on Switched Fibre-Channel connected storage. However, nothing in the design of the system 100 precludes its use on other types of storage networks 130, including storage networks that are not yet invented.

The hosts 140 issues I/O operation commands to the virtual disks 150, and in response, mapping agents 110 access the table 200. Although the agents 110 are generally associated with the hosts 140, in this way, the agents 110 isolate the table 200 from general host 140 access. Preferably, each of the hosts 140 has a separate agent 110, so that each host has a separate mapping table 200. Alternatively, the system 100 could be configured so that more than one host 140 connects to an agent 110. If multiple hosts 140 connect to the same agent 110, the hosts 140 share access to the particular table 200.

The agent 110 stores the mapping table 200 in a volatile memory 111, typically DRAM. As a result, if one of the agents 110 shuts down or loses power, that agent 110 loses its copy of the table 200. For instance if the mapping agent 110 is embedded in the host system 140 and takes its power from that host system, as would be the case for a backplane card that serves as the mapping agent, the host 140 may cause the mapping agent 110 to shut down by eliminating power to the agent 110. However, by storing the table 200 in volatile memory, the table 200 can be easily and rapidly accessed and modified on the agents 110. Storing the mapping table 200 in volatile memory has the further advantage of substantially reducing the cost and complexity of implementing the agents 110 as mapping components. Overall, the agents 110 allow the performance-sensitive mapping process to be parallelized and distributed optimally for performance.

The system 100 further comprises a controller 120 that, although separate from the agents 110, administers and distributes the mapping table 200 to the agents 110. Control of the mapping is centralized in the controller 120 for optimal cost, management, and other implementation practicalities. The controller 120 further stores the table 200 in a semi-permanent memory 121 so that the controller 120 retains the table 200 even after a power loss. The semi-permanent memory 121 is preferably a magnetic disk because of its high storage capacity and fast, frequently writing capabilities. The controller 120 may alternatively store the table 200 using other forms of programmable storage such as writeable optical media and electronically programmable memories. The controller 120 thus continues to store the table 200 even if the controller 120 shuts down or loses power.

In this way, the responsibility for persistent storage of the mapping tables 200 lies in the controller 120, consolidating both costs and complexity. The exact design of the controller 120 is not a subject of this disclosure. Instead, this disclosure focuses on the structure of the overall system and the interfaces between the mapping agent 110 and the controller 120. Accordingly, it should be appreciated that any controller, as known in the art of digital information storage, may be employed as needed to implement the present invention. Within this framework, each of the agents 110 preferably interacts with only the controller 120 and not with the other agents 110. As a result, the system 100 is highly scaleable and tolerant of component failures.

As described below, the interactions of the controller 120 and the agents 110 are defined in terms of functions and return values. In one embodiment of the virtual mapping system 100 illustrated in FIG. 3A, this communication is implemented with messages on some sort of network transport, such as a communication channel 132. In another implementation of the system 100 depicted in FIG. 3B, the communication channel 132 is the storage network 130 itself. Any suitable technique may be used to translate commands, faults, and responses to network messages. The communication channel 130 may employ any type of known data transfer protocol such as TCP/IP. The particular interactions between the functions and activities of the controller 120 are described in greater detail below.

Figure 4A:
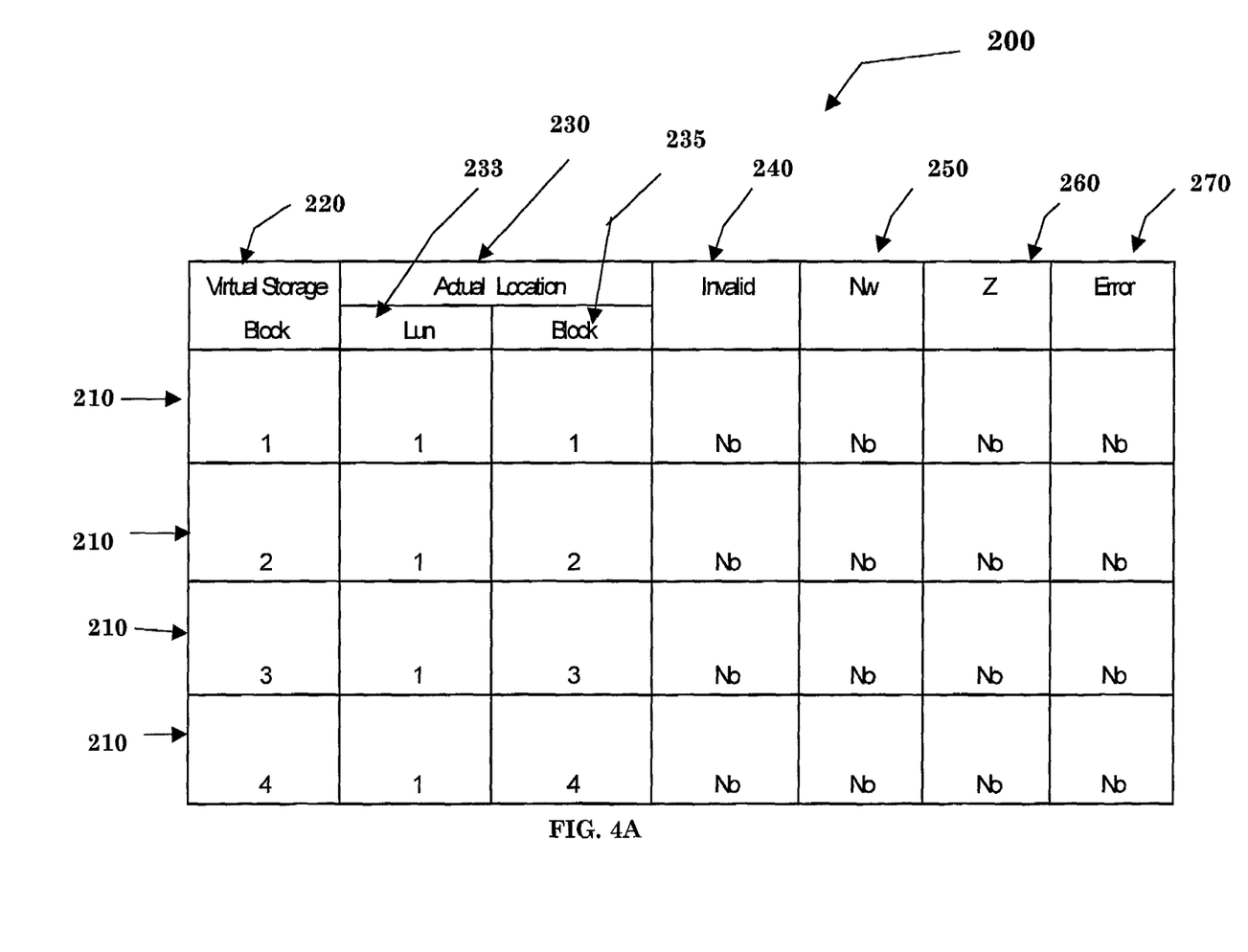
FIGS. 4A-4B are schematic illustrations of a mapping table for use in the distributed virtual storage area network of FIG. 3 in accordance with an embodiment of the present invention.
Figure 4B:
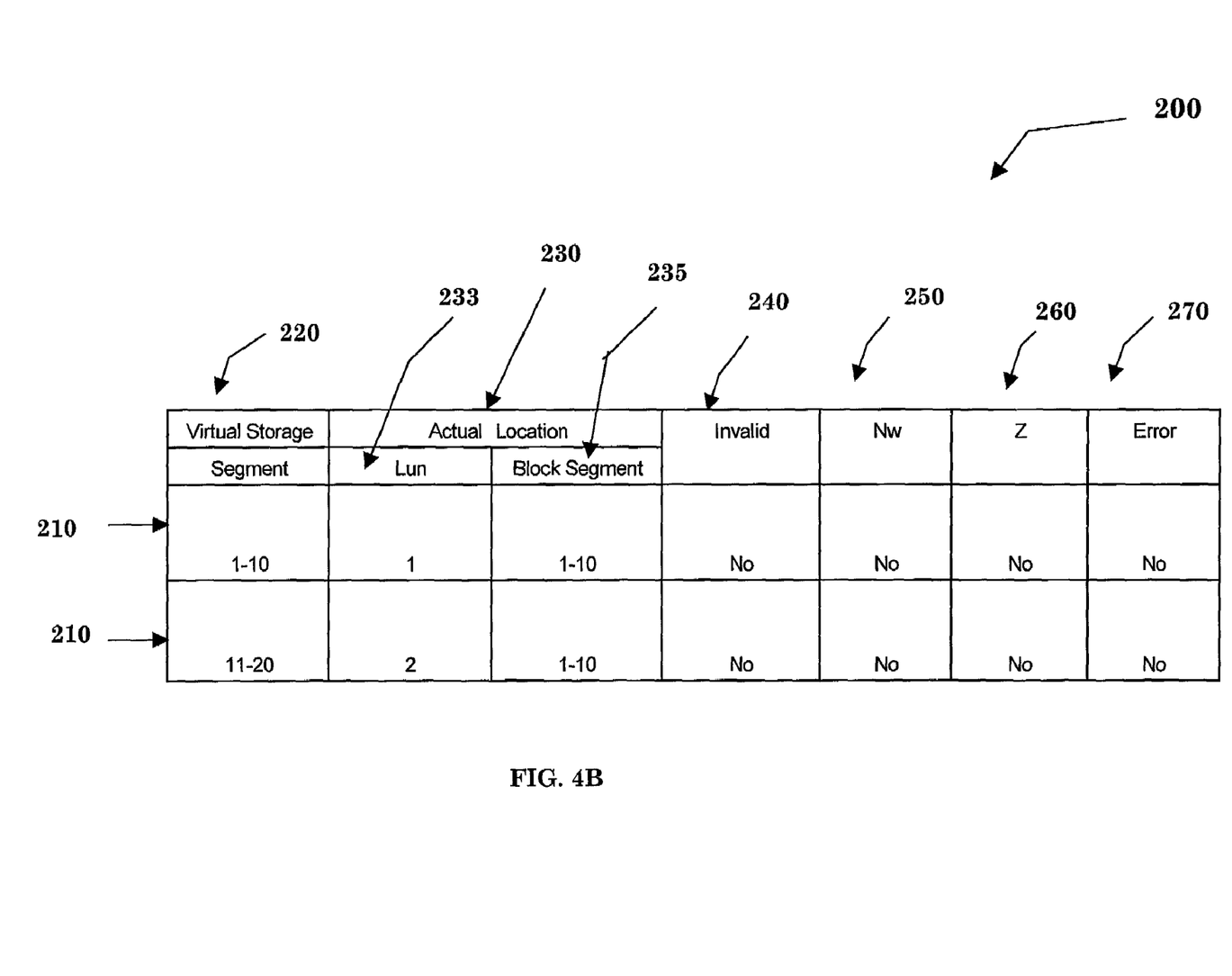

FIGS. 4A-4B schematically illustrate the contents of the table 200. As described above, the table 200 contains entries 210 (rows) that include a mapping between one or more virtual disk segments 220 and storage locations 230 on the storage containers 160. The storage locations 230 identify the particular storage container 160 and part of the storage container 160 that corresponds to the virtual disk index 220. The form for the storage locations 230 must be appropriate for the storage network being used. In a SCSI network, each of the storage locations 230 includes a LUN identifier 233 and a block identifier 235, also called an offset. All of the other fields in a mapping table entry 210 are simple integers or binary state values.

As depicted in FIG. 4A, the mapping table 200 may have one entry 210 per each "disk block" of the virtual disk 220. In an exemplary implementation the block of data is about 1 MB. While possible to build, this would result in huge mapping tables and highly fragmented mapping, both of which introduce undesirable performance degradations. In another embodiment, each mapping table entry 210 represents a variable sized group of contiguous virtual disk blocks that map to contiguous blocks on one of the physical storage containers 160. This configuration of the table 200 offers greater mapping flexibility and dense mapping structures, but introduces algorithmic complexity in managing the variable sized extents and greater map entry lookup costs.

In response, the table 200 of a preferred embodiment uses mapping table entries 210, each having a fixed size number of contiguous blocks ("segments") on the virtual disk 150 that map to one storage container 160, as depicted in FIG. 4B. In this embodiment, each of the entries 210 contains a virtual disk segment 220 instead of a virtual disk block. The block identifier 235 likewise identifies a corresponding segment of actual storage blocks. While FIG. 4B illustrates the table 200 identifying an entire range of values for the mapping table entry 220 and the block identifier 235, the table 200 could likewise identify only the beginning or end block where the size of the actual and virtual storage segments is otherwise defined. While this configuration of FIG. 4B for the table 200 is possibly not as dense as variable sized extent mapping, the configuration offers the simplest and highest performance map access and space management. Regardless of the specifics of the table 200, the table 200 must map a virtual disk segment 220 to each physical storage block involved in I/O operations.

In a preferred embodiment, the system 100 has multiple tables 200, each having different mappings between a virtual disk 150 and the storage containers 160. In this way, different hosts 140 may have different access to the same storage container 160. Where the table 200 does not include one of the storage locations 230, hosts 140 using this table (i.e., the hosts 140 connecting to the agent 110 that stores this table) cannot access information stored at the storage location. In fact, the host 140 will not realize that this storage location 230 exists.

During operation, the host 140 issues an I/O operation (e.g., read or write) to some block or blocks on a virtual disk 150. Each virtual memory block is represented in the mapping table 200, either as an individual entry or as part of a virtual disk segment 220. Each block contained in the I/O operation is mapped to the appropriate location on the storage container 160. The mapping agent 110 issues a corresponding I/O operation issued to the storage container 160. The I/O operation results are then collected and presented as a completed operation on the virtual disk 150.

In addition to mapping information specifying the storage location, each mapping table entry 210 also contains several states. The states are Boolean variables that provide information on the current status of the virtual disk segment. These states are important because they allow the table 200 stored in the agent 110 to be remotely loaded and manipulated from the controller 120. These states and interfaces provide the ability for the mapping tables to be distributed and for the mapping table entries to be volatile. The disclosure first describes the states and, then, explains some of the functions for the states. The table 200 includes at least an invalid state 240 indicating whether any I/O operations may occur on the virtual disk segment 220 and its corresponding physical location 230. The invalid state may be activated during a first I/O operation to prevent further I/O operations until completion of the first I/O operation. In a preferred embodiment, the table 200 further includes a no-write (Nw) state 250 that indicates whether the data contained at the corresponding physical location 230 may currently be changed. The Nw state 250 allows for improved storage system performance because it permits data to be read during another I/O operation. The invalid state 240 and the Nw state 250 function during dynamic loading of mapping table entries, dynamic mapping changes, volatility of mapping table entries, and data sharing among similar virtual disks 150.

When activated, the invalid state 240 generally indicates that the mapping table entry 210 contains no useable mapping information and cannot support I/O operations. Any attempt to implement an I/O operation through this table entry 210 causes the mapping agent 110 to send a fault message to the controller 120. The agent 110 does not proceed with the I/O operation until the controller 120 returns a fault response. In one embodiment, the system 100 initially activates the invalid state 240 for all entries 210 in the table 200 when the table 200 is newly created. In this way, the table 200 ignores any residual entries in memory from prior stored tables to insure that current entries are active and reliable. Similarly, the invalid state 240 may be activated when entry 210 is "forgotten" and lost by the mapping agent 110 volatile memory. If the invalid state 240 is activated in the entry 210, then all other values and states in the entry 210 are assumed to contain no valid information and are ignored.

Because the tables 200 located in the mapping agents 110 are volatile, any failure or restart of the mapping agents 110 causes all of the entries 210 to have an active invalid state 240. A sustained loss of communication between the controller 120 and mapping agent 110 also causes I/O operations to stop, either by making all mapping table entries revert to an active invalid state 240 or by adding additional mechanisms to suspend I/O operations until directed by the controller 120 to resume I/O operations. This configuration allows the controller 120 to continue coordinating other mapping agents 110 by knowing that a failed or unreachable mapping agent 110 has been placed into a known state, providing the controller 120 high availability of data access to the surviving mapping agents 110.

As presented above, the Nw state 250, when activated, indicates that any write operations to the virtual disk segment(s) 220 represented by the entry 210 cause the agent 110 to send a fault message the controller 120. The agent 110 does not allow the host 140 to write to the storage locations 230 until the controller 120 returns a fault response to deactivate the Nw state 250 or until the system 100 otherwise takes some action to write to a segment despite the active Nw state 250. Unlike the invalid state 240, the activated Nw state 250 prevents operations from generating faults. Instead, the agent 110 generally allows the host 140 to proceed to access data at the storage location 230. Accordingly, if only the Nw state is activated, table entry 210 must contain a useable storage location 230.

In another embodiment, the table 200 further includes a zero (Z) state 260. When active, the Z state 260 indicates that the virtual disk segment 220 represented by the entry 210 contains all zero bytes. This feature allows a virtual disk 150 to be created and appear to be initialized without the need to allocate or adjust any underlying non-virtual storage. If an entry 210 contains an active Z state 260, the agent 110 ignores the storage address 230. If the host 140 attempts to read information stored at storage address 230, the agent 110 returns only zero-filled blocks regardless of the actual contents of the storage address 230. On the other hand, any attempts to write data at the storage address 230 when Z state 260 is active cause the agent 110 to send a fault message to the controller 120. The agent 110 does not allow the host 140 to write to the storage locations 230 until the controller 120 returns a fault response that deactivates the Z state 260 or until the system 100 otherwise takes some action to write to a segment despite the active Z state 260.

In another configuration, the mapping table 200 further includes an error (E) state 270. When active, the E state 270 indicates the existence of an error condition and provides the information necessary to instruct the agent to return an error without disrupting any previous state. The E state 270 is used where a pre-existing failure is known and such failure would cause any attempts at I/O access to fail. It should be noted, however, that the E state 270 could also be used as the means to issue an error status from a mapping fault. If an entry 210 contains an active E state 270, the agent 110 ignores the storage address 230. If the host 140 attempts to read from or write to the storage address 230, the agent 110 returns an error to the host 140.

The interaction of the agent 110 and the controller 120 is now described in greater detail. In one category of interactions, fault/response operations, the agent 110 sends a message to the controller 120 indicating the occurrence of a fault during an I/O operation to the table 200. Typically, the fault occurs as a result of an activated state (as described above) that prevents the execution of the I/O operation by the agent. The agent 110 sends the fault message is to the controller 120. The controller then determines an appropriate action and commands the agent 110 accordingly.

In one type of fault/response operation, a map fault, the mapping agent 110 alerts the controller 120 that an I/O operation requested by the host 140 cannot be completed because the mapping table entry 210 has an activated state that prevents the completion of the requested I/O operation. For example, the mapping agent 110 produces a fault message to the controller 120 in response to a request for any I/O operation to a table entry 210 having an active invalid flag 240 or an attempt to write to storage address 230 having an active corresponding Nw flag 250. The map fault message from the agent 110 generally identifies the requested I/O operation, the virtual disk segment 220 involved, and the table state preventing the I/O operation. When the fault occurs, the agent does not attempt to carry out the I/O operation. Instead, the controller 120 uses the fault message to respond to the faulted I/O operation (e.g. load map entry, change map entry, delay until some other operation has completed). The controller 120 response informs the mapping agent 110 how to proceed to overcome the cause for the fault.

The controller 120 generally instructs the agent 110 either to resolve the problem or to send an error message to the requesting host. When resolving the problem, the controller 120 sends a replacement table entry 210. The agent 110 then inserts the new table entry 210 in the table (in place of the former faulty entry) and then retries I/O operation. If the controller 120 cannot resolve the problem, it instructs the agent 110 to issue an error message to the host. To cause the agent 110 to issue an error message, the controller instructs the agent to activate the error state 260 for the table entry 210 causing the fault. As described above, the agent 110 then issues an error message to the host 140 regardless of the other contents of the table entry 210.

Commands to the agent 110 initiated by the controller 120 comprise a second category of interactions, command/response operations. Among these commands initiated by the controller 120 include the creation of a new mapping table 200 with all entries set to have an active invalid flag or the deletion of an existing table 200. The controller 120 may obtain from the agent 110 the contents of one of the entries 210 or the status of the one of the states in this entry 210. The controller 120 can further order the agent 110 to set all of the contents for one of the entries 210 or the status of one of the states for the entry 210. It should be noted that once the invalid state 240, the error state 260, and the zero state 270 are active, the controller 120 cannot deactivate the state because, as described above, initial activation of these states voids the storage address 230. To deactivate these states, the controller 120 must instruct the agent 110 to replace the existing entry 210 with an entirely new entry. To each of these commands, the agent 110 returns a response to the controller 120 after completing the ordered task.

When the controller 120 instructs the agent to either set or obtain information from the table 200, the system optimally allows the controller 120 to specify multiple, contiguous map table entries 210 in a single command. This arrangement allows the agent 110 and the controller 120 to interact more efficiently and with fewer instructions.

When the controller 120 commands the agent 110 to set one or all of the values and states in the table entry 210, the controller 120 command to the agent 110 optimally includes a blocking flag. The blocking flag instructs the agent 110 to delay responding to the controller 120 command until after the completion of any I/O operations initiated before the command. The blocking flag applies to only that command in which it resides. Other concurrent commands and subsequent commands are not generally affected by the blocking flag of one command. In particular, the agent 110 immediately changes the table 200, as instructed in the command, but does not notify the controller 120 of this change until completing all previously existing I/O operations. In this way, the agent 110 signals to the controller 120 the completion of all I/O operations using the former table 200 that do not reflect the changes to the table specified in the command.

During a majority of the operation, the mapping agent 110 operates without faults. In non-fault cases, i.e. the mapping table entries 210 are valid and do not have any active states that prevent the requested I/O operation, the virtual disk I/O operates entirely through the mapping agent 110. Thus, all I/O operations proceed through the mapping table 200 and directly to the physical storage containers 160 without any involvement of the controller 120. As a result, the controller 120 inserts itself into an I/O stream only when needed to perform various management operations and typically does not become involved in non-faulting cases, allowing the system 100 to have high performance and scalability.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed:

1. A virtual storage system for linking a host to one or more storage devices over a network, the system comprising:
    an agent connected to the host, the agent having volatile memory for storing a first copy of a table, the table having entries to map virtual disk positions, to locations on the storage devices; and
    a controller coupled to the agent, the controller having non-volatile memory for storing a second copy of the table, the controller intermittently causing contents of the first copy of the table to be replaced by contents of the second copy of the table,
    whereby during an input/output (I/O) operation, the host accesses one of the entries in the table stored on the agent to determine one of the storage device locations.

2. The system of claim 1, wherein the table entries further include an indication of whether an invalid state is activated such that the invalid state for a table entry becomes activated when that table entry contains no useable mapping information.

3. The system of claim 2, wherein the agent does not allow the host to complete the I/O operations with one of the entries if the invalid state for that entry is activated.

4. The system of claim 1, wherein the table entries further include an indication of whether a no-write state is activated such that the no-write state for one of the entries becomes activated when data cannot be written to the storage location contained in that entry.

5. The system of claim 4, wherein the agent does not allow the host to write data to the storage location in one of the entries if the no-write state for that entry is activated.

6. The system of claim 1, further comprising a communication channel to couple the agent and the controller.

7. The system of claim 6, wherein the communication channel employs a data transfer protocol to transport messages on the communication channel.

8. The system of claim 1, wherein the entries include an offset.

9. The system of claim 8, wherein the offset includes logic unit number identifier.

10. The system of claim 8, wherein the offset includes a block identifier.

11. The system of claim 10, wherein the entries further includes a segment of virtual disk positions.

12. A system for mapping a virtual disk segment to a storage location within a storage device, comprising:
    a host computer to issue an I/O operation identifying a logical unit and a block identifier within the logical unit;
    an agent connected to a host computer, the agent having a volatile memory module for storing a first copy of a table having entries to map a virtual disk position to a storage location on the storage devices and a plurality of variables indicating states of the respective entries; and
    a controller coupled to the agent, the controller having non-volatile memory for storing a second copy of the table, the controller intermittently causing contents of the first copy of the table to be replaced by contents of the second copy of the table.

13. The system of claim 12, wherein the memory is volatile.

14. The system of claim 12, wherein said storage location comprises a block of data within the storage device.

15. The system of claim 14, wherein the block of data is 1 MB.

16. The system of claim 12, wherein the agent is coupled to the host.

17. The system of claim 12, wherein the plurality of variables comprise Boolean variable.

18. The system of claim 12, wherein the states include an invalid state.

19. The system of claim 18, wherein the plurality of variables includes a variable for the invalid state.

20. The system of claim 12, wherein the states include a no-write state.

21. The system of claim 20, wherein the plurality of variables includes a variable for the no-write state.

22. The system of claim 12, wherein the states include a zero state.

23. The system of claim 12, wherein the states include an error state.

24. The system of claim 12, wherein said storage location comprises a variable sized group of contiguous virtual disk blocks.

25. The system of claim 12, wherein said table entry represents a variable sized group of contiguous virtual disk blocks.

26. The system of claim 25, wherein said contiguous virtual disk blocks map to contiguous blocks on a storage container.

27. The system of claim 12, wherein said table entry comprises a beginning block.

28. The system of claim 12, wherein said table entry comprises an ending block.

* * * * *

UNITED STATES PATENT AND TRADEMARK OFFICE
CERTIFICATE OF CORRECTION

| | | |
|---|---|---|
| PATENT NO. | : 7,269,631 B2 | Page 1 of 1 |
| APPLICATION NO. | : 09/872970 | |
| DATED | : September 11, 2007 | |
| INVENTOR(S) | : James M. Reuter et al. | |

It is certified that error appears in the above-identified patent and that said Letters Patent is hereby corrected as shown below:

In column 9, line 32, in Claim 1, after "positions" delete ",".

In column 10, line 55, in Claim 26, after "on a" insert -- physical --.

Signed and Sealed this

Twenty-fourth Day of June, 2008

JON W. DUDAS
*Director of the United States Patent and Trademark Office*